(12) United States Patent
Alsaeed et al.

(10) Patent No.: US 11,381,590 B2
(45) Date of Patent: Jul. 5, 2022

(54) PREDICTING FALSE POSITIVES FROM VULNERABILITY SCANNERS USING DATA ANALYTICS AND MACHINE LEARNING

(71) Applicant: Saudi Arabian Oil Company, Dhahran (SA)

(72) Inventors: Saeed A. Alsaeed, Dhahran (SA); Irslan Siddiq, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 408 days.

(21) Appl. No.: 16/700,633

(22) Filed: Dec. 2, 2019

(65) Prior Publication Data

US 2021/0168165 A1    Jun. 3, 2021

(51) Int. Cl.
*H04L 9/40* (2022.01)
*G06N 20/00* (2019.01)
*G06N 5/04* (2006.01)

(52) U.S. Cl.
CPC ........... *H04L 63/1433* (2013.01); *G06N 5/04* (2013.01); *G06N 20/00* (2019.01)

(58) Field of Classification Search
None
See application file for complete search history.

(56) References Cited

U.S. PATENT DOCUMENTS 7,991,726 B2    8/2011  Zhou et al.
8,468,244 B2    6/2013  Redlich et al.
9,548,987 B1 *  1/2017  Poole ................ H04L 63/1408
10,097,574 B2 * 10/2018 Tripp ..................... G06N 20/00
2014/0331326 A1 * 11/2014 Thakur ............... H04L 63/1433
                                                                726/25

FOREIGN PATENT DOCUMENTS

CN    109871688 A    6/2019

OTHER PUBLICATIONS

Awalin Sopan, et al., "Building a Machine Learning Model for the SOC, by the Input from the SOC, and Analyzing it for the SOC," 2018 IEEE Symposium on Visualization for Cyber Security (VIZSEC).

(Continued)

*Primary Examiner* — Cai Y Chen
(74) *Attorney, Agent, or Firm* — Leason Ellis LLP

(57) ABSTRACT

A method and system for remediating a vulnerability in a first computing resource asset in a computer network, including receiving vulnerability scanning results data from each respective one of a plurality of diverse vulnerability scanners, storing the vulnerability scanning results data as a collection of vulnerability scanning results data, normalizing and extracting common features from the normalized data, vectorizing the common features to determine feature vectors, applying a false positive predictor model to predict a false positive, separating vulnerability scanning results data that corresponds to one or more predicted false positives from a remainder of the collection of vulnerability scanning result data, and sending the remainder of the collection of vulnerability scanning results data to a second computer resource asset.

23 Claims, 7 Drawing Sheets

(56) References Cited

OTHER PUBLICATIONS

Iberia Medeiros, et al., titled "Automatic Detection and Correction of Web Application Vulnerabilities using Data Mining to Predict False Positives".

Bradley, Tony, et al. "Using Machine Learning to Reduce False Positives." Security Boulevard, Apr. 1, 2019, securityboulevard.com/2019/04/using-machine-learning-to-reduce-false-positives.

S. Gowda, D. Prajapati, R. Singh and S. S. Gadre, "False Positive Analysis of Software Vulnerabilities Using Machine Learning," 2018 IEEE International Conference on Cloud Computing in Emerging Markets (CCEM), Bangalore, India, 2018, pp. 3-6.

Wisseman, Stan. "How Machine Learning Boosts Application Security Testing." TechBeacon, TechBeacon, Jan. 22, 2019, techbeacon.com/enterprise-it/how-machine-learning-boosts-application-security-testing.

International Search Report and Written Opinion in Corresponding PCT Application No. PCT/US2020/062640 dated Feb. 16, 2021. 12 pages.

\* cited by examiner

| IP# | Asset Type | Version | Vulnerability Type | Vulnerabilities | Vulnerability Detected |
|---|---|---|---|---|---|
| 10.1.X.1 | Exchange | 15.1.1591.10 | Missing Patch | CVE-2018-123456789 | 1/1/2019 |
| 10.1.X.2 | Server | RHEL 7.2 | Missing Patch | CVE-2019-987654321 | 2/15/2019 |
| 10.1.X.3 | Server | RHEL 7.2 | Missing Patch | CVE-2017-789009876 | 2/20/2017 |
| 10.1.X.4 | Server | 17763.107.10 10129-1455 | Missing Patch | CVE-2016-543267890 | 2/21/2018 |
| 10.1.X.5 | ERP | ERP 3.X | Configuration | X.Config=A,B | 6/1/2019 |
| 10.1.X.6 | Application | Java 8.1 | Missing Patch | CVE-2019-202020123 | 12/31/2018 |
| 10.1.X.7 | Database | Oracle 12.1 | Configuration | log_archive_st art | 11/15/2018 |
| 10.1.X.8 | Database | Oracle 18 | Configuration | serial_reuse | 11/15/2018 |
| 10.1.X.9 | Application | ERP 3.X | Missing Patch | Patch # 20190101 | 11/15/2018 |

FIG. 5

| IP# | Asset Type | Version | Vulnerability Type | Vulnerabilities | Vulnerability Detected | False Positive |
|---|---|---|---|---|---|---|
| 10.1.X.1 | Exchange | 15.1.1591.10 | Missing Patch | CVE-2018-123456789 | 1/1/2019 | Y |
| 10.1.X.2 | Server | RHEL 7.2 | Missing Patch | CVE-2019-987654321 | 2/15/2019 | Y |
| 10.1.X.3 | Server | RHEL 7.2 | Missing Patch | CVE-2017-78909876 | 2/20/2017 | Y |
| 10.1.X.4 | Server | 17763.107.10 10129-1455 | Missing Patch | CVE-2016-543267890 | 2/21/2018 | N |
| 10.1.X.5 | ERP | ERP 3.X | Configuration | X.Config=A,B | 6/1/2019 | Y |
| 10.1.X.6 | Application | Java 8.1 | Missing Patch | CVE-2019-202020123 | 12/31/2018 | N |
| 10.1.X.7 | Database | Oracle 12.1 | Configuration | log_archive_st art | 11/15/2018 | Y |
| 10.1.X.8 | Database | Oracle 18 | Configuration | serial_reuse | 11/15/2018 | Y |
| 10.1.X.9 | Application | ERP 3.X | Missing Patch | Patch # 20190101 | 11/15/2018 | N |

FIG. 6

PREDICTING FALSE POSITIVES FROM VULNERABILITY SCANNERS USING DATA ANALYTICS AND MACHINE LEARNING

FIELD OF THE DISCLOSURE

The present disclosure relates to a cybersecurity solution that includes a system, method and computer program for handling false positives in vulnerability scan reports from various and diverse types of vulnerability scanners, and for remediating security vulnerabilities in a computer network.

BACKGROUND OF THE DISCLOSURE

The Internet is a worldwide network of interconnected computer networks that use the Transmission Control Protocol/Internet Protocol (TCP/IP) to link communicating devices worldwide. The Internet includes private, public, academic, business, and government networks, all of which are interlinked by arrays of electronic, wireless, wired, or optical networking technologies. The Internet carries a broad range of information resources and services, including the World Wide Web (WWW), electronic mail, telephony, and file sharing. As the Internet evolves and network systems become increasingly under attack, cybersecurity solutions are taking on greater importance. However, existing cybersecurity solutions have significant shortcomings that are addressed by the technology solution provided in this disclosure.

SUMMARY OF THE DISCLOSURE

The disclosure provides a cybersecurity solution, including a method, a system, and a computer program for handling false positives in vulnerability scan reports received from various vulnerability scanners of different types, and for remediating security vulnerabilities in a computer network.

According to a nonlimiting embodiment of the disclosure, a method is provided for remediating a vulnerability in a first computing resource asset in a computer network. The method comprises: receiving vulnerability scanning results data from each respective one of a plurality of diverse vulnerability scanners, each vulnerability scanner being arranged to scan a different type of computer resource asset in the computer network; storing the received vulnerability scanning results data from each one of the plurality of diverse vulnerability scanners as a collection of vulnerability scanning results data; parsing data from the collection of vulnerability scanning results data; normalizing the parsed data; extracting common features from the normalized data; vectorizing the common features to determine feature vectors; applying a false positive predictor model to predict a false positive vulnerability in the collection of vulnerability scanning results data; separating vulnerability scanning results data that corresponds to one or more predicted false positives from a remainder of the collection of vulnerability scanning result data; and sending the remainder of the collection of vulnerability scanning results data to a second computer resource asset.

The method can comprise: creating a vector matrix based on the feature vectors; or updating a vector matrix based on the feature vectors; or remediating a vulnerability in the first computer resource asset based on a vulnerability scan report in the remainder of the collection of vulnerability scanning results data; or analyzing the vulnerability scanning results data that corresponds to the one or more predicted false positives to determine whether any of the one or more predicted false positives is a real false positive; or removing the vulnerability scanning results data that corresponds to the real false positive from any remaining vulnerability scanning results data that corresponds to the one or more predicted false positives; or determining a predicted false positive in the one or more predicted false positives is not a real false positive and optimizing the false positive predictor model based on vulnerability scanning results data that corresponds to the determined not a false positive.

In the method, applying the false positive prediction model can comprise applying the vector matrix to predict the false positive vulnerability in the collection of vulnerability scanning results data. The second computer resource asset can be arranged to interact with a user.

According to another nonlimiting embodiment of the disclosure, a system is provided for remediating a vulnerability in a first computing resource asset in a computer network. The system comprises: a receiver arranged to receive vulnerability scanning results data from each respective one of a plurality of diverse vulnerability scanners, each vulnerability scanner being arranged to scan a different type of computer resource asset in the computer network; a storage arranged store the received vulnerability scanning results data from each one of the plurality of diverse vulnerability scanners as a collection of vulnerability scanning results data; a normalizer arranged to normalize the collection of vulnerability scanning results data into normalized data; a feature extractor arranged to extract common features from the normalized data; a vectorizer arranged to vectorize the common features to determine feature vectors; a false positive determiner arranged to apply a false positive predictor model to predict a false positive vulnerability in the collection of vulnerability scanning results data; a vulnerability remediator arranged to separate vulnerability scanning results data that corresponds to one or more predicted false positives from a remainder of the collection of vulnerability scanning result data; and a transmitter arranged to send the remainder of the collection of vulnerability scanning results data to a second computer resource asset.

In the system: the vectorizer can be arranged to create or update a vector matrix based on the feature vectors; or the false positive determiner can be arranged to apply the vector matrix to predict the false positive vulnerability in the collection of vulnerability scanning results data; or the second computer resource asset can be arranged to remediate a vulnerability in the first computer resource asset based on a vulnerability scan report included in the remainder of the collection of vulnerability scanning results data; or the second computer resource asset is arranged to interact with a user; or the second computer resource asset can be arranged to analyze the vulnerability scanning results data that corresponds to the one or more predicted false positives to determine whether any of the one or more predicted false positives is a real false positive; or the second computer resource asset can be arranged to remove the vulnerability scanning results data that corresponds to the real false positive from any remaining vulnerability scanning results data that corresponds to the one or more predicted false positives.

According to another non-limiting embodiment of the disclosure, a non-transitory computer readable storage medium is provided for storing computer program instructions that, when executed by a security appliance, remediate a vulnerability in a first computing resource asset in a computer network. The computer program instructions comprise the steps of: receiving vulnerability scanning results data from each respective one of a plurality of diverse vulnerability scanners, each vulnerability scanner being arranged to scan a different type of computer resource asset in the computer network; storing the received vulnerability scanning results data from each one of the plurality of diverse vulnerability scanners as a collection of vulnerability scanning results data; parsing data from the collection of vulnerability scanning results data; normalizing the parsed data; extracting common features from the normalized data; vectorizing the common features to determine feature vectors; applying a false positive predictor model to predict a false positive vulnerability in the collection of vulnerability scanning results data; separating vulnerability scanning results data that corresponds to one or more predicted false positives from a remainder of the collection of vulnerability scanning result data; and sending the remainder of the collection of vulnerability scanning results data to a second computer resource asset.

The computer program instructions can comprise a further step of: creating or updating a vector matrix based on the feature vectors; or applying the false positive prediction model comprises applying the vector matrix to predict the false positive vulnerability in the collection of vulnerability scanning results data; or remediating a vulnerability in the first computer resource asset based on a vulnerability scan report in the remainder of the collection of vulnerability scanning results data; or analyzing the vulnerability scanning results data that corresponds to the one or more predicted false positives to determine whether any of the one or more predicted false positives is a real false positive; or removing the vulnerability scanning results data that corresponds to the real false positive from any remaining vulnerability scanning results data that corresponds to the one or more predicted false positives; or determining a predicted false positive in the one or more predicted false positives is not a real false positive and optimizing the false positive predictor model based on vulnerability scanning results data that corresponds to the determined not a false positive.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description explain the principles of the disclosure. No attempt is made to show structural details of the disclosure in more detail than may be necessary for a fundamental understanding of the disclosure and the various ways in which it may be practiced.

FIG. 5 shows a nonlimiting example of a vector matrix that can be generated or updated by the security appliance, shown in FIG. 4.

FIG. 6 shows the vector matrix of FIG. 5 provided with an additional column for false positive identification tags.

Figure 1:
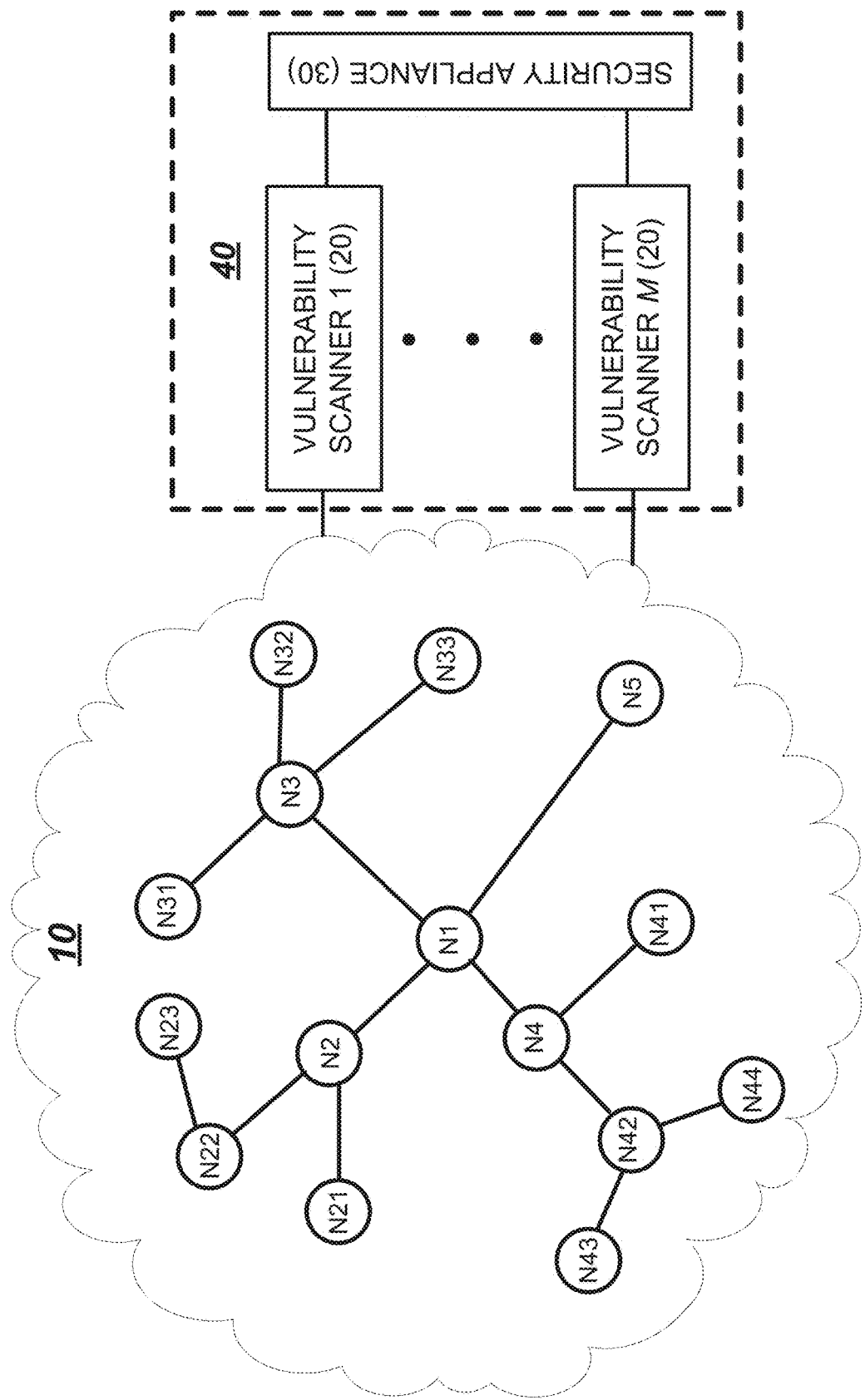
FIG. 1 shows a nonlimiting example a computer network provided with the cybersecurity solution, according to the principles of the disclosure.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques can be omitted so as to not unnecessarily obscure the embodiments of the disclosure. The examples used are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

Computer networks are continuously exposed to cyber-attack threats, many of which can be catastrophic to a computer network, network users or the entity that owns, controls, manages or has valuable computer resource assets in the network, if successfully exploited. In computer networks with large footprints of computer resource assets, identification or assessment of security vulnerabilities can be a daunting task. This is because large computer networks typically have large numbers of diverse computer resource assets, including servers, workstations, network devices, security appliances, IoT ("Internet of Things") devices, cameras, printers, software, and temporarily connected communicating devices. The problem can be compounded by many times if the computer network is distributed with computer resource assets located in different geographic locations or regions, such as, for example, with distributed systems.

Security teams typically use multiple off-the-shelf vulnerability scanners (or vulnerability scanning tools) of diverse types to conduct vulnerability assessments of computer resource assets in large computer networks. The vulnerability scanning results, however, are frequently include false positives and, therefore, necessitate manual analysis by security teams, which can result in critical vulnerabilities being overlooked or not timely remediated. Moreover, identification and classification of false positives can be a time-consuming process that requires significant expertise and human resources from security and operational staff. The problem can be compounded by many times where the vulnerability scanning results include vulnerability scanning results data from different types of vulnerability scanners that are used to scan diverse types of computer resource assets in the computer network. Since a single comprehensive solution to scan all types of computer resource assets in a computer network does not exist, there is a great and urgent need for a cybersecurity solution that can be used with multiple vulnerability scanners of different types to get full coverage of the diverse types of computer resource assets that can be included in a computer network. The solution should be capable of receiving and analyzing vulnerability scanning results data that can vary in type, format, content or meaning, depending on the vulnerability scanner from which the vulnerability scanning results data is received.

By way of overview and introduction, the present disclosure provides a cybersecurity solution that can accurately identify, assess and remediate security vulnerabilities in different types of computer resources assets, including predicting false positives in vulnerability scanning results that are generated by diverse types of vulnerability scanners. The cybersecurity solution can be arranged to: collect vulnerability scanning results data of all scans from various vulnerability scanning solutions; normalize the data such that common features can be extracted; extract features from the data; structure the data in feature vectors; and create a training dataset for supervised machine learning based on the feature vectors. The vulnerability scanning results data can be collected from various vulnerability scanners, including, but not limited to, for example, infrastructure vulnerability scanners, configuration compliance scanners, application vulnerability scanners and source code scanners. The vulnerability scanning results data can be stored in a central repository, which can include a Big Database that supports file-based data storage.

The vulnerability scanning results data collected from various vulnerability scanners can be processed and features extracted that can be used to train a machine learning model. The features can be combined in a training dataset that includes one or more vector matrices. A different vector matrix can be created for a variety of types of vulnerability scanning results. Resultantly, appropriate features can be extracted for different types of vulnerability scanning results. A dataset can be provided to the machine learning model that can categorize false positive data using supervised machine learning techniques. Once the data model has been trained, vulnerability scanning results can be fed to the model to accurately predict false positives. False positives predicted by the model can then be analyzed and the model can be further trained, if needed.

The cybersecurity solution can be arranged to analyze outputs from, for example, diverse code scanning solutions and, based on user interactivity, learn to identify false alarms in future scans. The cybersecurity solution can be arranged to identify false positives in vulnerability scans from computer resource assets such as, for example, operating systems, network devices, applications, databases, and code scanners (static or dynamic).

In a nonlimiting embodiment, the cybersecurity solution can include one or more of: receiving vulnerability scanning results data, at a central location, from multiple vulnerability scanners, each of which can be of a different type arranged to assess vulnerabilities in a different type of computer resource asset; parsing, at the central location, data from the plurality of vulnerability scanning results; normalizing, at the central location, the parsed data; extracting, at the central location, common features from the normalized data; vectorizing, at the central location, the common features to generate or update one or more vector matrices; building, based on the vector matrices, a training dataset for supervised machine learning; applying, at the central location, the training dataset to a second plurality of vulnerability scanning results from the plurality of respective vulnerability scanning tools to determine false positives; and sending, from the central location, vulnerability remediation data to a computing resource asset located at, for example, a node that is operated by a security analyst. The central location can include a security appliance, such as, for example, the security appliance 30 (shown in FIGS. 1, 2, and 4), discussed below. The cybersecurity solution can include machine learning, including supervised or unsupervised machine learning.

The following description includes a nonlimiting embodiment of the cybersecurity solution that includes supervised machine learning. However, unsupervised machine learning can be implemented instead of, or in addition to supervised learning as will be understood by those skilled in the art.

FIG. 1 shows an example of a computer network 10 that is provided with the cybersecurity solution, according to the principles of the disclosure. The computer network 10 can include a private network, a private enterprise network, a business network, a corporate network, an academia network, a military network, a government network or any other type of network. Any one or more of a plurality of nodes N in the network 10 can include a computer resource asset that can be connected to an external network (not shown), such as, for example, the Internet, or a communicating device (not shown) that is located internally or externally to the computer network 10. The cybersecurity solution can include a plurality of vulnerability scanners 20 and a security appliance 30. The plurality of vulnerability scanners 20 can include M vulnerability scanners, where M is a positive integer greater than 1. The vulnerability scanners 20 and security appliance 30 can be arranged as separate devices or modules that are internal or external to the computer network 10, or in a network security system 40 that includes a plurality of computing devices or modules. The network security system 40 can include a computing resource asset such as, for example, a server or a network of servers. The vulnerability scanners 20 and security appliance 30 can be located anywhere internal or external to the computer network 10. The security appliance 30 can include one or more machine learning platforms, including one or more supervised machine learning platforms and/or one or more unsupervised machine learning platforms.

As seen in FIG. 1, the computer network 10 can include a plurality of nodes N1, N2, N21, N22, N23, N3, N31, N32, N33, N4, N41, N42, N43, N44, and N5 (collectively or individually referred to as a node "N"). The security appliance 30 can communicate with each of the vulnerability scanners 20 and any one or more of the nodes N in the computer network 10. The security appliance 30 can receive vulnerability scanning results data from each of the vulnerability scanners 20. The vulnerability scanning results data can include, for example, vulnerability scan report data. The received vulnerability scanning results data can be stored in a database, such as, for example, database 45 (shown in FIG. 2) or database 170 (shown in FIG. 4), either or both of which can include a Big Database (for example, an Apache Hadoop database). The security appliance 30 can be implemented autonomously, without any human intervention.

The nodes N can include a variety of types of computer resource assets, including, but not limited to, for example, servers, workstations, network devices, IoT devices, Internet Protocol (IP) cameras, third party computing resources, database engines, or programming source code. Each of these types of computer resource assets can be scanned for vulnerabilities by the vulnerability scanners 20 and all resultant vulnerability scanning results can be output by the vulnerability scanners 20 and sent to the security appliance 30 as vulnerability scanning results data.

The vulnerability scanners 20 can include any vulnerability scanner, including, for example, commercial off-the-shelf vulnerability scanners capable of scanning the different types of computer resource assets in the network 10. The vulnerability scanners 20 can include various types of static vulnerability assessment tools, including commercial off-the-shelf static vulnerability assessment tools. The vulnerability scanners 20 can include, for example, infrastructure vulnerability scanners, configuration compliance scanners, application vulnerability scanners and source code scanners. The vulnerability scanners 20 can include, for example, any one or more of Static Application Security Testing (SAST) tools, Software Composition Analysis (SCA) tools, Database Security Scanning (DSS) tools, Mobile Application Security Testing (MAST) tools, Interactive Application Security Testing (IAST) tools, Application Security Testing as a Service (ASTaaS) tools, Correlation tools, Test Coverage Analyzer tools, Application Security Testing Orchestration (ASTO) tools, or any static vulnerability assessment tool that can analyze computing resource assets and detect, identify and assess vulnerabilities in those computing resource assets.

The vulnerability scanners 20 can be arranged to directly access the computer resource assets at each of the nodes N in the computer network 10, determine computing resource asset configuration issues, missing security patches, cross-site scripting (XSS) injections, structured query language (SQL) injections, command injections, path traversal vulnerabilities, or any other detectable or known vulnerabilities in the computing resource assets. The vulnerability scanners 20 can record each vulnerability in a vulnerability scanning report as vulnerability scanning results data. The vulnerability scanning results data can include an identification of the applicable node N, an Internet Protocol (IP) address, a media access control (MAC) address, or any other data that can uniquely identify the applicable computing resource asset or node. The vulnerability scanning results data can include a description of each vulnerability, type of vulnerability, time of scan, or any other information that can identify the vulnerability.

The security appliance 30 can be arranged to accurately determine security vulnerabilities in different types of computer resources assets, including predicting false positives in multiple types of vulnerability scanning results that are generated by the different types of vulnerability scanners 20. The security appliance 30 can be arranged to remediate determined vulnerabilities or send instructions and data to a communicating device, such as, for example, a security analyst communicating (SAC) device 47 (shown in FIG. 2), which can be arranged to interact with a security analyst.

The security appliance 30 can receive vulnerability scanning results data from each of the multiple vulnerability scanners 20, each of which can be different in type or ability to assess vulnerabilities in a particular type of computer resource asset. As noted earlier, the received vulnerability scanning results data can be aggregated or stored in a database such as, for example, the database 45 (shown in FIG. 2) or 170 (shown in FIG. 4). The vulnerability scanners 20 can be selected or placed online so that a vulnerability scanner is included that can scan and assess vulnerabilities for each type of computer resource asset in the computer network 10. For instance, the vulnerability scanners 20 can be arranged to scan all workstations, tablets, laptops, servers, databases, source code, software, web applications, IoT devices, smartphones, printers, facsimile machines, VoIP telephones, and any other type of computer resource asset included in the computer network 10, so as to provide comprehensive or complete coverage for the entire network.

The security appliance 30 can be arranged to parse the vulnerability scanning results data. The security appliance 30 can be arranged to normalize the vulnerability scanning results data. The security appliance 30 can be arranged to extract common features from the normalized data and vectorize the common features to generate or update one or more vector matrices. The security appliance 30 can be arranged to convert the extracted features and data into a vectored format. The security appliance 30 can be arranged to build a training dataset for supervised machine learning based on the one or more vector matrices. The security appliance 30 can be arranged to apply the training dataset to a supervised machine learning platform to build or update a machine learning model for the computer network 10, which can be applied to subsequent vulnerability scanning results data to predict false positives. The security appliance 30 can be arranged to remediate determined vulnerabilities or transmit vulnerability remediation data to a computing resource asset located at, for example, a node N that is operated or overseen by a security analyst, such as, for example, the SAC device 47 (shown in FIG. 2).

Given the challenges and limitations of vulnerability scanners generally, the security appliance 30 can be arranged to predict false positives reported by the different types of vulnerability scanners 20 that are used to scan the computer resource assets in the network for security vulnerabilities. The security appliance 30 can include a supervised machine learning model that can learn from training datasets that include confirmed vulnerabilities. The training datasets can include classification labels provided by, for example, security analysts via a security analyst communicating device (e.g., SAC device 47, shown in FIG. 2) after analyzing the vulnerabilities and corresponding vulnerability scanning results data. The classification labels can include, for example, a type of vulnerability, a type of computer resource asset, a severity or priority level for the vulnerability, or any other classification that can aid in generating or selecting feature vectors for analysis of diverse types of vulnerability scanning results data.

Figure 2:
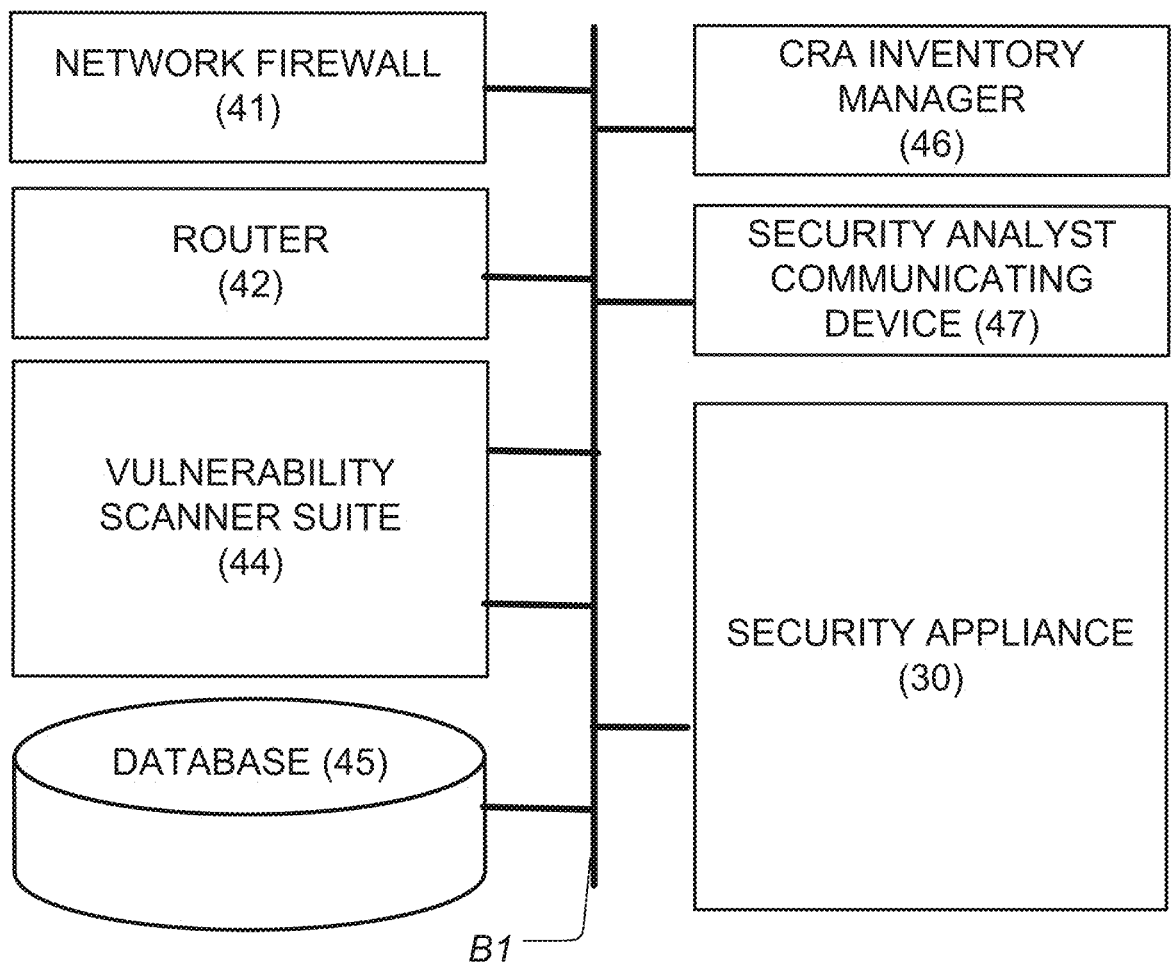
FIG. 2 shows a nonlimiting embodiment of a network security system, arranged according to the principles of the disclosure.
Figure 4:
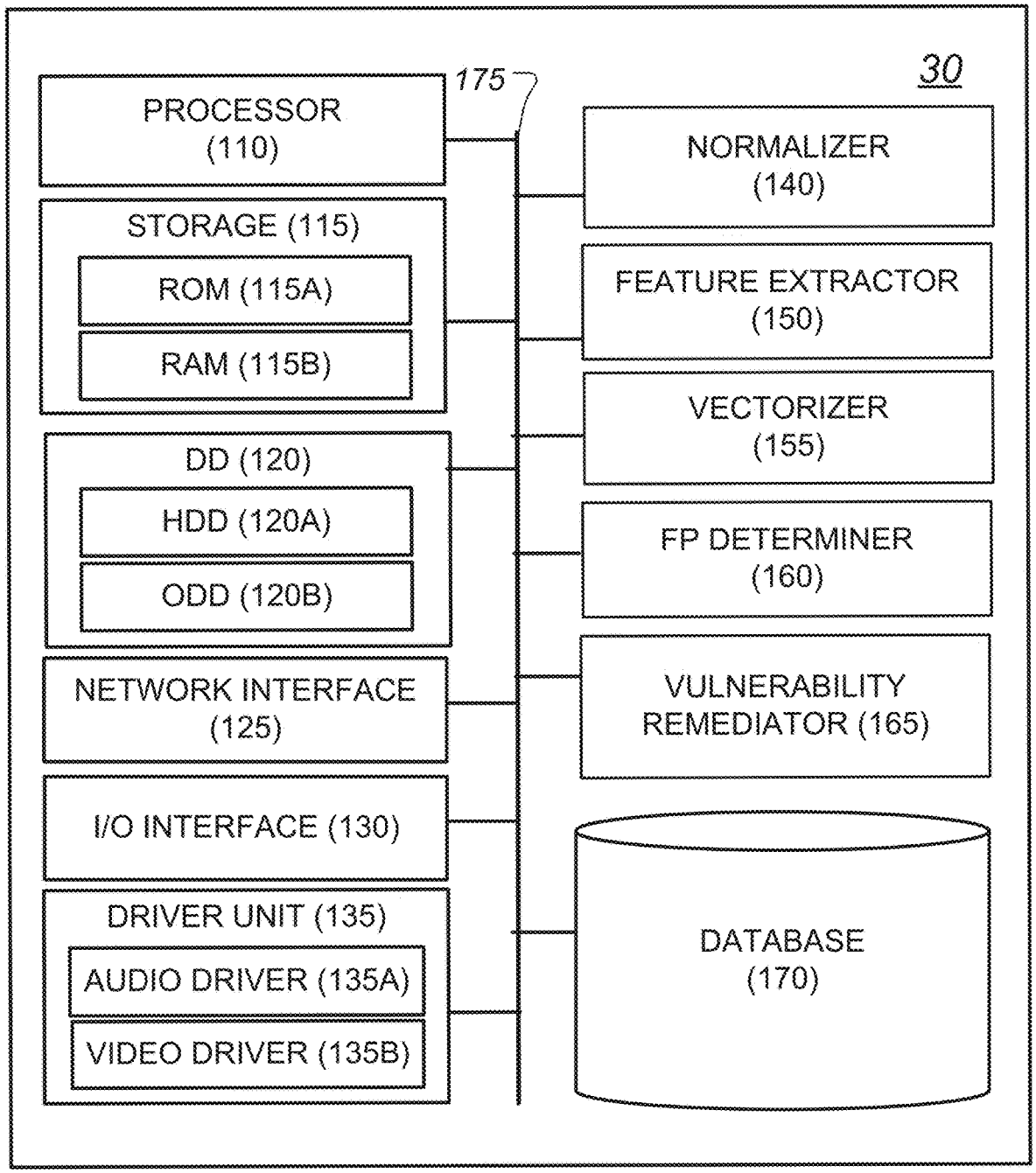
FIG. 4 shows a nonlimiting embodiment of a security appliance, constructed according to the principles of the disclosure.

Once the machine learning (ML) model is trained, it can predict false positives in the vulnerability scanning results data received from the various types of vulnerability scanners 20, either in real-time or by retrieving vulnerability scanning results data from a database (for example, DB 45 in FIG. 2, or DB 170 in FIG. 4). These false positives can be sent together with the corresponding vulnerability scanning results data to a communicating device to be reviewed and investigated by a security analyst (e.g., SAC device 47, shown in FIG. 2) to reduce the amount of false reporting. Alternatively, the false positives can be analyzed and verified by another machine learning platform provided in the security appliance 30 or elsewhere, which can be arranged to analyze and assess false positive predictions. The security analyst communicating device can be arranged to operate autonomously or through interaction with a security analyst.

FIG. 2 shows a nonlimiting embodiment of the network security system 40, arranged according to the principles of the disclosure. The network security system 40 includes the network security appliance 30. The network security system 40 can include additional computer resource assets that provide security analysis, malware protection, application visibility and control, reporting, secure mobility, and protection against threats that can arise relating to the computer resource assets in the computer network 10. The network security system 40 can include a network firewall 41, a router 42, a vulnerability scanner suite 44, a database 45, and a computer resource asset (CRA) inventory manager 46. The network security system 40 can include a security analyst communicating (SAC) device 47. The network security system 40 can include a backbone B1. Each of the components 30 and 41 to 47 can be connected to the backbone B1 by a communication link.

The components 30 and 41 through 47 can be located at various nodes N in the computer network 10. One or more of the components 41 to 47 can be collocated with or incorporated into the security appliance 30.

The network security system 40 can be arranged to perform all security tasks for the computer network 10, including predicting vulnerabilities or attacks, detecting vulnerabilities, threats or attacks, identifying or predicting false positives, preventing threats or attacks, monitoring computer resource assets, remediating vulnerabilities in computer resource assets, and responding to threats or attacks.

The network firewall 41 can be arranged to monitor all data traffic incoming into or outgoing from the computer network 10 and log source and destination IP addresses, port numbers, and protocols. The network firewall 41 can monitor connections and data packets for all protocols used by the computer network 10, including transmission control protocol (TCP), user datagram protocol (UDP), Internet control message protocol (ICMP), simple mail transfer protocol (SMTP), or any other protocol for data packets transmitted to, from, or within the computer network 10. The network firewall 41 can log all connections or data packets that are blocked by the firewall, which can be stored as log data locally in the network firewall 41 or in the database 45. The log data can include event data such as, for example, disabled port openings, dropped data packets, dynamic port openings, firewall policies and rules, repeated unsuccessful access attempts by a communicating device having a particular IP address or group of IP addresses, outgoing connections from servers in the computer network 10, or any other event or data that might be useful in identifying vulnerable computing resources in the network.

The network firewall 41 can be arranged to transmit, or it can be arranged to be accessed by the security appliance 30 to transmit the firewall log data to the security appliance 30. The log data can be transmitted as one or more computer files (such as, for example, W3C extend log format (.log) files) or a data feed (such as, for example, a rich site summary (RSS) data feed), which can be transmitted at time intervals that are of sufficient frequency or duration to capture and transmit all firewall log data for the computer network 10 to the security appliance 30. The log data can include a header section comprising static, descriptive information about the log file or data, as well as available data fields, and a body section that includes compiled data relating to the data traffic that tried to cross the firewall. The log data can be transmitted to the security appliance 30 as a dynamic list, continuously adding and transmitting most recent firewall log events as they occur in real-time.

The router 42 can include one or more routing tables, which can include routing table data such as, for example, source IP address, destination IP address, route distance, network topology, network-next hop (or gateway) mapping, and interface IP address. The router 42 can be arranged to transmit, or it can be arranged to be accessed by the security appliance 30 to transmit the routing table data to the security appliance 30. The routing table data can be transmitted as one or more computer files or a data feed, which can be transmitted at time intervals that are of sufficient frequency or duration to capture and transmit all routing table data for the computer network 10 to the security appliance 30.

The vulnerability scanner suite 44 can include the plurality of diverse vulnerability scanners 20 (vulnerability scanners 1 to M (shown in FIG. 1), where M is a positive integer greater than 1), which in the aggregate can be arranged to scan and assess vulnerabilities in all scannable computer resource assets in the computer network 10. The vulnerability scanner suite 44 includes multiple vulnerability scanners that can provide full coverage of the different types of computer resource assets in the computer network 10 (shown in FIG. 1). The vulnerability scanner suite 44 can include a unique output (not shown) for each vulnerability scanner in the vulnerability scanner suite 44, each of which can output vulnerability scanning results data that can differ in type, format, content, meaning or other properties from the outputs of the other vulnerability scanners. The vulnerability scanning results data can include false positives, which can result from, for example, incompatibility of the version of the computer resource asset being scanned, inadequate authorizations on the target computer resource asset, presence of firewalls or inaccessibility to ports to be scanned. In case of source code, static code vulnerability scanners can generate false positives due to, for example, an inability or lack of understanding of business logic by the vulnerability scanner, presence of firewalls or other mitigating controls.

Without the network security system 40 or security appliance 30, determination or prediction of false positives in vulnerability scanning results for a large computer network 10 would be a daunting or impossible task that would require significant time expenditure by skilled security analysts, and that could overwhelm available security analysts, making it impossible for them to review all false positives. Also, without the network security system 40 or security appliance 30, false positives could go unnoticed or unidentified until they are reported to operations teams to apply fixes.

The computer resource asset inventory manager (CRAIM) 46 can be arranged to manage and implement an inventory of all computer resource assets and nodes in the computer network 10. The CRAIM 46 can be arranged to provide a profile for each computer resource asset or node N in the computer network 10. The CRAIM 46 can be arranged to periodically update CRA inventory data for the network 10, which can include the CRA inventory data and historical data for all nodes in the computer network 10. The CRA inventory data can be stored in the database 45 (or the database 170, shown in FIG. 4). The CRA inventory data can include related data for each node N, including, for example, CRA configuration, IP address, MAC address, policies, rules, hardware, software, contracts, purchase orders, licenses, warranties, and security features, which can include, for example, malware protection, antivirus, status of software patches, types of vulnerabilities scans performed, vulnerability scan date, vulnerability scan results, and security remediation performed.

The security analyst communicating (SAC) device 47 can include a communicating device that is located at a node N. The SAC device 47 can be arranged to interact with or be operated by a security analyst. The SAC device 47 can be located internal or external to the computer network 10. The SAC device 47 can be arranged to perform security vulnerability scanning of computer resource assets at one or more nodes in the computer network 10 and generate vulnerability scanning results data that summarizes the results of the scanning, including security vulnerabilities in the scanned computer resource asset.

The SAC device 47 can be arranged to perform penetration testing of one or more computer resource assets in the computer network 10 and determine security vulnerabilities, which can be logged in an SAC vulnerability scanning results report that includes, for each scanned node N, an IP address, a description of the computer resource asset, the type of computer resource asset, the time of scan, a description of penetration testing performed, the type of security vulnerability discovered, a description of discovered vulnerability, a description of remediation (if any) performed, and the time of remediation (if any). The SAC vulnerability scanning results data can be stored in the database 45 (or database 170, shown in FIG. 4).

Each of the vulnerability scanners in the vulnerability scanner suite 44, as well as any of the DB 45, CRAIM 46, or SAC device 47, can be arranged to access, or they can be arranged to be accessed by the security appliance 30 to transmit vulnerability scanning results data, CRAIM inventory data, and SAC vulnerability scanning results data to the security appliance 30 and/or database 45. The data can be sent periodically or continuously.

Figure 3:
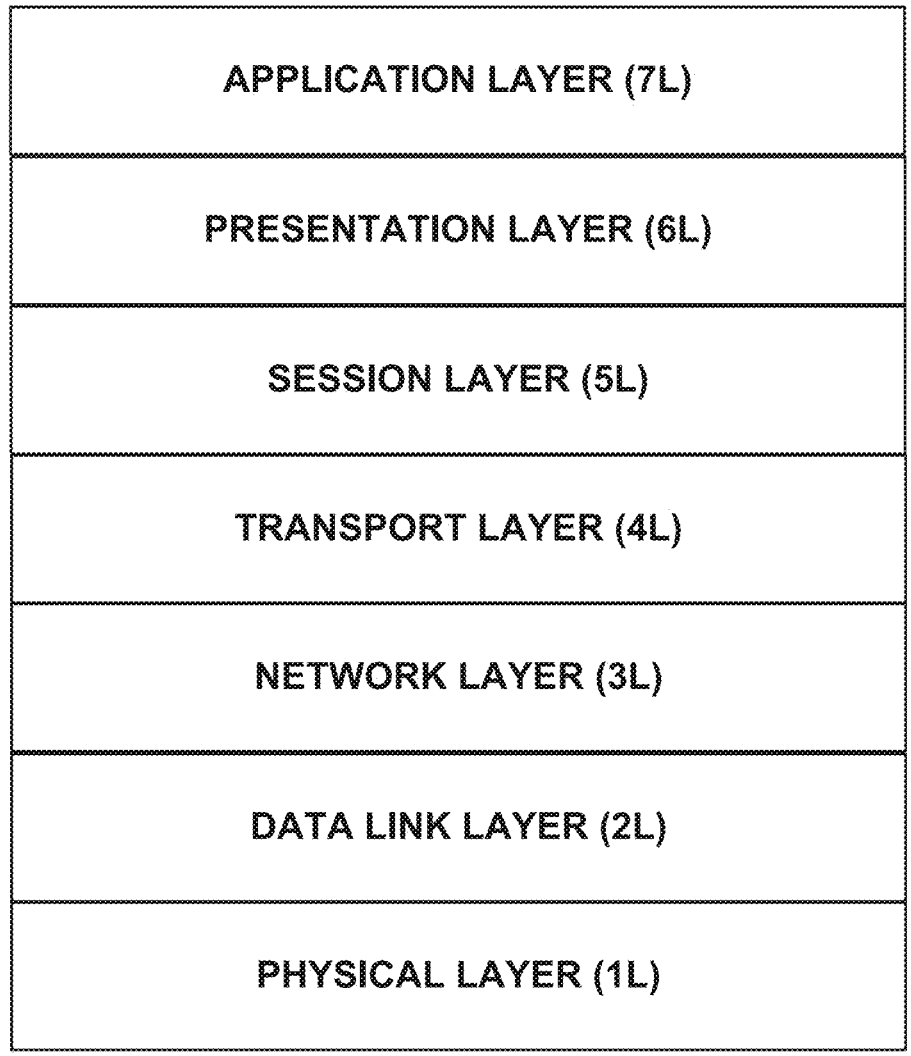
FIG. 3 shows the seven-layer OSI model that can be implemented by computer resource assets in this disclosure.

FIG. 3 shows the seven-layer OSI model that can be implemented by any of the components 30 and 41-47 (shown in FIG. 2). The application layer 7L is the OSI layer in a computer resource asset that is closest to the user. The application layer 7L interacts with software applications in the computer resource asset that implement a communicating component. The application layer 7L can include an email application, a web browser, or any other computing resource that an end user can interact with to operate the computer resource asset, including, for example, initiate, control, manage, or terminate functions performed by the computer resource asset.

The presentation layer 6L establishes context between software applications, which might use different syntax and semantics. The presentation layer 6L transforms data into a form that each software application can accept. An operating system is an example of the presentation layer 6L.

The session layer 5L controls the communication connections between computer resource assets in the computer network 10 or between a computer resource assets in the network and computer resource assets external to the computer network 10. This layer is responsible for establishing, managing and terminating connections between local and remote applications. The layer can provide for full-duplex, half-duplex, or simplex operations, and is responsible for establishing checkpointing, adjournment, termination, and restart procedures.

The transport layer 4L provides the functional and procedural mechanisms for transferring variable-length data sequences from a source computer resource asset to a destination computer resource asset, while maintaining quality-of-service (QoS). The transport layer 4L controls the reliability of a given link through flow control, segmentation and desegmentation, and error control. The transport layer 4L can include, for example, tunneling protocols, the Transmission Control Protocol (TCP) and the User Datagram Protocol (UDP).

The network layer 3L provides the functional and procedural mechanisms for transferring data packets from a computer resource asset in a network (for example, a LAN) to another computer resource asset on a different network (for example, a different LAN). If the data to be transmitted is too large, the network layer 3L can facilitate splitting the data into a plurality of segments at the node and sending the fragments independently to the other node, where the segments can be reassembled to recreate the transmitted data. The network layer 3L can include one or more layer-management protocols such as, for example, routing protocols, multicast group management, network layer information and error, and network layer address assignment.

The link layer 2L is responsible for node-to-node transfer between computer resource assets in a communication system. In IEEE 802 implementations, the link layer 2L is divided into two sublayers, consisting of a medium access control (MAC) layer and a logical link control (LLC) layer. The MAC layer is responsible for controlling how computer resource assets in a network gain access to a medium and permission to transmit data. The LLC layer is responsible for identifying and encapsulating network layer protocols, and for controlling error checking and frame synchronization.

The physical layer 1L includes the hardware that connects the computer resource assets in the computer network 10. The hardware can include for example connectors, cables, switches, or any other devices that provide for transmission and reception of instruction and data streams between the computer resource assets.

FIG. 4 shows a nonlimiting embodiment of the security appliance 30, constructed according to the principles of the disclosure. The security appliance 30 can include a processor 110, a storage 115, a disk drive (DD) 120, a network interface 125, an input/output (I/O) interface 130, a driver unit 135, a normalizer 140, a feature extractor 150, a vectorizer 155 and false positive (FP) determiner 160. The security appliance 30 can include a vulnerability remediator 165 and a database (DB) 170. The components 140, 150, 155, 160 and 165 each can comprise a processor or have access to a processor and in certain embodiments are arranged by code executing in the processor to provide the functionality described herein, and in other embodiments can include firmware which is configured to provide the functionality described herein.

Any one or more of the components 115 to 170 can include a device or a module that is separate from the processor 110, as seen in FIG. 4, or integrated or integrateable in a device(s) such as the processor 110.

The security appliance 30 can include a sound generation device (not shown), such as, for example, a speaker, a sound pickup device (not shown), such as, for example, a microphone, or a display device (not shown), such as, for example, a light emitting diode (LED) display or a liquid crystal display (LCD). The security appliance 30 can include a voice command device (not shown), a smart voice recognition (not shown) or a voice activated device (not shown).

Any one or more of the components 140 through 165 can be implemented as one or more computing devices or machine learning platforms. In a nonlimiting embodiment, the normalizer 145, feature extractor 150, vectorizer 155 and/or FP determiner 160 can be implemented as one or more machine learning platforms, which can be included in one or more computing devices. The machine learning platform can include, for example, an artificial neural network (ANN), a convolutional neural network (CNN), a deep CNN (DCNN), an RCNN, a Mask-RCNN, a deep convolutional encoder-decoder (DCED), a recurrent neural network (RNN), a neural Turing machine (NTM), a differential neural computer (DNC), a support vector machine (SVM), a deep learning neural network (DLNN), Naive Bayes, decision trees, linear regression, Q-learning, temporal difference (TD), deep adversarial networks, fuzzy logic, or any other machine intelligence platform capable of supervised learning.

In a nonlimiting embodiment, the machine learning platform includes supervised machine learning. In other nonlimiting embodiments, the machine learning platform can include unsupervised machine learning, semi-supervised machine learning, or reinforcement machine learning. The supervised machine learning can include a classification technology solution and a regression technology solution. The unsupervised machine learning can include a clustering technology solution.

The system bus 175 can include any of several types of bus structures that can further interconnect to a memory bus (with or without a memory controller), a peripheral bus, and a local bus using any of a variety of commercially available bus architectures. The system bus 175 can include a backbone.

The processor 110 can include any of various commercially available graphic processing unit devices. Dual microprocessors and other multi-processor architectures can be included in the processor 110. The processor 110 can include a central processing unit (CPU), a graphic processing unit (GPU), a general-purpose GPU (GPGPU), a field programmable gate array (FGPA), an application-specific integrated circuit (ASIC), or a manycore processor. The processor 110 includes a computing device.

The security appliance 30 can include the machine learning platform. The security appliance 30 can include a computer-readable medium that can hold executable or interpretable computer code or instructions that, when executed by the processor 110 or one or more of the other components (e.g., devices or modules) in the security appliance 30, causes the steps, processes or methods in this disclosure to be carried out. The computer-readable medium can be included in the storage 115 or DD 120. The computer readable medium can include sections or segments of computer program code that, when executed by one or more components in the security appliance 30, can cause the security appliance 30 to carry out the processes set forth in or contemplated by this disclosure, including the process steps described below, with reference to FIG. 7.

The storage 115 can include a read only memory (ROM) 115A and a random-access memory (RAM) 115B. A basic input/output system (BIOS) can be stored in the non-volatile memory 115A, which can include, for example, a ROM, an EPROM, or an EEPROM. The BIOS can contain the basic routines that help to transfer information between components in the security appliance 30, such as during start-up. The RAM 115B can include a high-speed RAM such as static RAM for caching data.

The DD 120 can include a hard disk drive (HDD) 120A and an optical disk drive (ODD) 120B. The HDD 120A can include, for example, an enhanced integrated drive electronics (EIDE) drive, or a serial advanced technology attachments (SATA) drive. The ODD 120B can include, for example, a read/write from/to a CD-ROM disk (not shown), or, read from or write to other high capacity optical media such as a digital versatile disc (DVD). The HDD 120A or ODD 120B can be configured for external use in a suitable chassis (not shown). The DD 120 can be connected to the system bus 175 by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications.

The storage 115 or DD 120, including computer-readable media, can provide nonvolatile storage of data, data structures, and computer-executable instructions. The storage 115 or DD 120 can accommodate the storage of any data in a suitable digital format. The storage 115 or DD 120 can include one or more apps or modules that are used to execute aspects of the architecture included in this disclosure.

One or more program modules can be stored in the storage 115 or DD 120, including an operating system (not shown), one or more application programs (not shown), one or more application program interfaces (APIs), other program modules (not shown), and program data (not shown). The APIs can include, for example, web APIs, simple object access protocol (SOAP) APIs, remote procedure call (RPC) APIs, representation state transfer (REST) APIs, or other utilities or services APIs. Any of the operating system, application programs, program modules, and program data can be cached in the RAM 115B as executable sections of computer code.

The network interface 125 can be connected to a network such as the computer network 10 (shown in FIG. 1) or the Internet (not shown). The network interface 125 can be connected to the computer resource assets in the computer network 10 (shown in FIG. 1), including, for example, multiple vulnerability scanners of different types (such as, for example, vulnerability scanners 20, shown in FIG. 1). The network interface 125 can include a wired or a wireless communication network interface (not shown) or a modem (not shown). When used in a LAN, the security appliance 30 can be connected to the LAN through the wired or wireless communication network interface; and, when used in a wide area network (WAN), the security appliance 30 can be connected to the WAN network through the modem. The modem (not shown) can be internal or external and wired or wireless. The modem can be connected to the system bus 175 via, for example, a serial port interface (not shown).

The (I/O) interface 130 can receive commands and data from an operator. The I/O interface 130 can be communicatively coupled to one or more input/output devices (not shown), including, for example, a keyboard (not shown), a mouse (not shown), a pointer (not shown), a microphone (not shown), a speaker (not shown), or a display (not shown). The received commands and data can be forwarded from the I/O interface 130 as instruction and data signals via the bus 175 to any component in the security appliance 30.

The driver unit 135 can include an audio driver 135A and a video driver 135B. The audio driver 135A can include a sound card, a sound driver (not shown), an interactive voice response (IVR) unit, or any other device necessary to render a sound signal on a sound production device (not shown), such as for example, a speaker (not shown). The video driver 135B can include a video card (not shown), a graphics driver (not shown), a video adaptor (not shown), or any other device necessary to render an image signal on a display device (not shown).

The normalizer 140 can be arranged to preprocess vulnerability scanning results data received from the multiple vulnerability scanners of different types or platforms, such as, for example, the vulnerability scanners 20 (shown in FIG. 1) or vulnerability scanner suite 44 (shown in FIG. 2). The vulnerability scanning results data can be received from, for example, the database 170, or directly (for example, in real-time) from the vulnerability scanners 20 (shown in FIG. 1) or vulnerability scanner suite 44 (shown in FIG. 2). The normalizer 140 can be arranged to analyze variances of different features in the vulnerability scanning results data and normalize or standardize the analyzed features to determine common features in the vulnerability scanning results data. The normalizer 140 can include, for example, batch normalization, instance normalization, layer normalization, group normalization, deep adaptive input normalization (DAIN), "min-max" normalization ($X_{norm}=(X-X_{min})/(X_{max}-X_{min})$, where $X_{min}$ and $X_{max}$ are the minimum and maximum values in X, where $X_{norm}$ is the normalized value of observed values of X), z-score normalization or any other normalization suitable for feature scaling based on the type of machine learning algorithm, such as, for example, k-nearest neighbors, k-means, logistic regression, random forest or linear discriminant analysis. The normalizer 140 can include a preprocessing module, such as, for example, Python's open-source machine learning platform scikit-learn. The normalizer 140 can include a deep adaptive input normalization (DAIN) layer in a deep neural network that can learn to normalize data and adaptively change a normalization scheme such as, for example, during inference in the neural network model.

The feature extractor 150 can be arranged to transform raw data to a feature space that is suitable for the machine learning platform(s) in the security appliance 30. The feature extractor 150 can be arranged to transform normalized data from the normalizer 140. The output(s) of the feature extractor 150 can include a reduced set of feature vectors that are extracted from the multiple types of vulnerability scanning results data. The feature extractor 150 can be arranged to extract static feature vectors from the vulnerability scanning results data.

The feature extractor 150 can include a dimensionality reducer, such as, for example, principal component analysis (PCA), kernel PCA, multilinear PCA (MPCA), independent component analysis (ICA), linear discriminant analysis (LDA), locally linear embedding (LLE), t-distributed stochastic neighbor embedding (t-SNE), autoencoders (AE), partial least squares (PLS), latent semantic analysis (LSA), multifactor dimensionality reduction (MDR), nonlinear dimensionality reduction (NDR), multilinear subspace learning, semidefinite embedding, or any other technical solution that can be arranged to transform or project raw data from a high dimension (for example, three or greater dimensions) onto a lower dimension (for example, two-dimensional feature subspace).

The vectorizer 155 can be arranged to receive the feature vectors from the feature extractor 150 and generate or update one or more vector matrices that can be implemented to train the machine learning model. The vectorizer 155 can create a different vector matrix for each type, or for an aggregate of multiple types of vulnerability scanning results data. For instance, the vulnerability scanning results data for an IoT device (not shown) in the computer network 10 (shown in FIG. 1) can be different from the vulnerability scanning results data for source code in a computing resource. The vectorizer 155 can combine the feature vectors for the different types of vulnerability scanning results data into one or more vector matrices.

FIG. 5 shows a nonlimiting example of a vector matrix that can be generated or updated by the vectorizer 155 and employed to train the machine learning model or to predict false positives in vulnerability scanning results data. The vector matrix can include feature vectors for each computer resource asset or node in a computer network (for example, computer network 10, shown in FIG. 1) for which vulnerability scanning results data is received and features extracted. In the nonlimiting example shown in FIG. 5, the vector matrix includes the following nonlimiting feature vectors for each of the nodes having IP addresses 10.1.X.1 through 10.1.X.9): the type of computer resource asset at the node that was scanned by a vulnerability scanner (for example, vulnerability scanner 20, shown in FIG. 1; or vulnerability scanner suite 44, shown in FIG. 2); the version of the scanned computer resource asset; the type of vulnerabilities determined by the vulnerability scanner for the computer resource asset; a description of the vulnerabilities determined for the computer resource asset; and the date when the vulnerability was detected. In this nonlimiting example, the description of the vulnerabilities can include a Common Vulnerabilities and Exposures (CVE) vulnerability identifier.

The false positive (FP) determiner 160 can be arranged to operate in a machine learning model training mode or a machine learning model prediction mode. As noted above, the normalizer 140, feature extractor 150, vectorizer 155 and/or FP determiner 160 can be arranged as a single device or module or as a plurality of devices or modules. In the training mode, the FP determiner 160 can be arranged to receive a training dataset, which can include one or more vector matrices that can be formatted similar to the nonlimiting example of the vector matrix shown in FIG. 5. The vulnerability scanning results data corresponding to the vector matrix can be analyzed and false positives verified, such as, for example, by the SAC device 47 (shown in FIG. 2). The vector matrix can be updated to include a false positive confirmation tag ("Y" or "N") for each vulnerability. For instance, the vector matrix can include an additional column (or row), as shown in FIG. 6. The column (or row) can include a false positive confirmation tag ("Y" or "N") for each vulnerability, indicating whether the associated vulnerability has been analyzed and confirmed to be a false positive ("Y") or a true vulnerability ("N").

In a nonlimiting embodiment, the FP determiner 160 can be trained with a large training dataset having, for example, thousands, hundreds of thousands, or millions of training samples. The false positive confirmation tags can be generated or updated based on analysis of the corresponding vulnerability scanning results data, for example, by a security analyst at the SAC device 47 (shown in FIG. 2), who can include a "false positive" or "vulnerability" classification tag for each vulnerability that is analyzed and assessed. The FP determiner 160 can be arranged to operate in the prediction mode after initial training.

In the training mode, the FP determiner 160 can be arranged to be trained using one or more training datasets, as will be understood by those skilled in the art, including, for example, a training dataset, a test dataset and a validation dataset. The FP determiner 160 can be arranged to be periodically or continuously updated, so as to accurately predict false positives in vulnerability scanning results data received from diverse types of vulnerability scanners. Model parameters can be generated or updated on an ongoing basis based on analysis results from, for example, the SAC device 47 (shown in FIG. 2), training datasets, or as part of the process 200 (shown in FIG. 7).

In the prediction mode, the FP determiner 160 can be arranged to predict false positive vulnerabilities in vulnerability scan reports generated by the plurality of different types of vulnerability scanners and received as vulnerability scanning results data from the plurality of scanners. The FP determiner 160 can be arranged to transmit predicted false positives to the SAC device 47 (shown in FIG. 2) for analysis and, where appropriate, further training of the machine learning model. The FP determiner 160 can be arranged to send the vulnerability scanning results data that includes the predicted false positive vulnerabilities to the SAC device 47, or to send the data to another computing device (not shown) or module in the security appliance 30, which can include a machine learning platform, as mentioned above. The FP determiner 160 can be arranged to send vulnerability scanning results data for which no false positives were predicted to the vulnerability remediator 165.

The vulnerability remediator 165 can be arranged to receive vulnerability scanning results data without predicted false positives and mitigate or remediate vulnerabilities in the corresponding computer resource assets, including those identified in the vulnerability scanning results data. Alternatively, the vulnerability remediator 165 can be arranged to transmit the vulnerability scanning results data to, for example, the SAC device 47 (shown in FIG. 2), where the vulnerabilities can be analyzed and remediated, for example, through interaction of the SAC device 47 with the corresponding computer resource assets. The vulnerability remediator 165 can be arranged to mitigate the vulnerabilities by, for example, but not limited to, implementing patches or fixes to source code in the computer resource assets corresponding to the vulnerabilities, disconnecting the computer resource assets from the computer network, breaking connectivity links to the computer resource assets, terminating access to the computer resource assets, modifying firewall policies or rules, or modifying router policies or rules.

The database 170 can be arranged to store vulnerability scanning results data and training datasets. The database 170 can be arranged to store vector matrices. The database 170 can be arranged to be accessed by any one or more of the components 110 through 165, as well as other computer resource assets, such as, for example, the SAC device 47 (shown in FIG. 2). The database 170 can be arranged to receive queries and, in response, retrieve specific records or portions of records based on the queries. The database 170 can include a database management system (DBMS) that can interact with the components 110 through 165. The DBMS can be arranged to interact with computer resource assets outside of the security appliance 30, such as, for example, the SAC device 47 (shown in FIG. 2). The database 170 can include a DBMS such as, for example, SQL, MySQL, Oracle, Access, or Unix. The database 170 can include a relational database. The database 170 can include the computing resource asset base for the entire computer network 10 (shown in FIG. 1).

Figure 7:
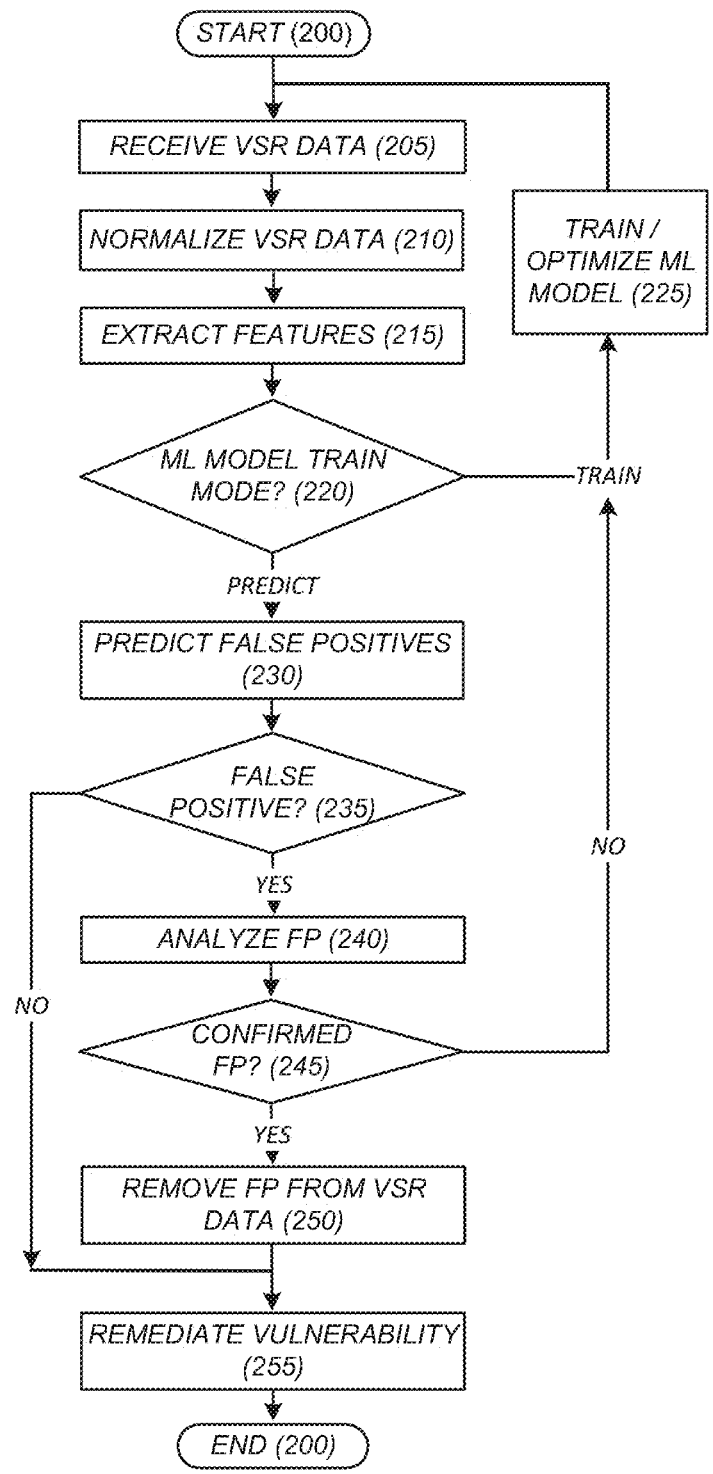
FIG. 7 shows a nonlimiting embodiment of a vulnerability remediation process that can be carried out by the security appliance in FIG. 4.

FIG. 7 shows a nonlimiting embodiment of a vulnerability remediation process 200, according to the principles of the disclosure. Referring to FIGS. 1, 4 and 7, the security appliance 30 can receive vulnerability scanning results (VSR) data from the plurality of diverse security scanners 20 (shown in FIG. 1) and store the data in the database 170 (shown in FIG. 4). The security appliance 30 can retrieve the diverse types of VSR data from the database 170, or it can receive the VSR data directly (for example, in real-time) from the plurality of diverse security scanners 20 (Step 205). The VSR data can be normalized by the normalizer 140 (shown in FIG. 4) to determine common features in the VSR data (Step 210). Based on the normalized data, features can be extracted from the VSR data by the feature extractor 150 (shown in FIG. 4) (Step 215).

The security appliance 30 can operate in a machine learning (ML) model training mode or prediction mode (Step 220). If the security appliance 30 is in the ML model training mode ("TRAIN" at Step 220), then, using the extracted features, the vectorizer 155 (shown in FIG. 4) can generate or update one or more vector matrices (including model parameters) (for example, shown in FIG. 5), apply the vector matrices (including model parameters) to the ML model to train or optimize the ML model (Step 225), and return to receive new VSR data to further train the ML model.

If the security appliance 30 is in the ML model prediction mode ("PREDICT" at Step 220), then the FP determiner 160 (shown in FIG. 4) can apply the ML model to the VSR data to predict false positives (Step 230). The VSR data can be divided into two data streams, depending on whether the VSR data is predicted to include false positives ("YES" at Step 235) or not ("NO" at Step 235).

For the VSR data stream that includes predicted false positives ("YES" at Step 235), the VSR data can be analyzed to determine whether each false positive was accurately predicted by the model (Step 240). The VSR data can be analyzed by another machine learning model in the security appliance 30, which can be dedicated to determining whether false positives are accurately predicted by the false positive prediction model, or the VSR data can be sent to the SAC device 47 (shown in FIG. 2) where the VSR data can be analyzed, for example, by a security analyst to verify the accuracy of the false positive predictions.

If a false positive is confirmed ("YES" at Step 245) as a result of the analysis of the VSR data (Step 240), then the VSR data corresponding to the confirmed false positive can be removed from the VSR data (Step 250) and the remaining VSR data can be sent for vulnerability remediation, for example, by a computer resource asset, such as the vulnerability remediator 165 (shown in FIG. 4) or the SAC device 47 (shown in FIG. 2) (Step 255). If the VSR data corresponding to the predicted false positive is determined to be a true vulnerability ("NO" at Step 245), then the VSR data and determination can be sent to optimize the ML model by, for example, updating parameters in the model (Step 225).

For the VSR data stream that does not include any predicted false positives ("NO" at Step 235), that VSR data can be sent for vulnerability remediation, such as, for example, to the vulnerability remediator 165 (shown in FIG. 4) or SAC device 47 (shown in FIG. 2), where one or more vulnerabilities identified in the VSR data can be remediated (Step 255).

The terms "a," "an," and "the," as used in this disclosure, means "one or more," unless expressly specified otherwise.

The term "backbone," as used in this disclosure, means a transmission medium or infrastructure that interconnects one or more computing devices or communication devices to provide a path that conveys data packets and instruction signals between the one or more computing devices or communication devices. The backbone can include a bus or a network. The backbone can include an ethernet TCP/IP. The backbone can include a distributed backbone, a collapsed backbone, a parallel backbone or a serial backbone.

The term "communicating device," as used in this disclosure, means any computing device, hardware, firmware, or software that can transmit or receive data packets, instruction signals or data signals over a communication link. The communication device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G or 5G cellular standards, or Bluetooth. A communication link can include, for example, an RS-232, RS-422, RS-485, or any other suitable interface.

The terms "computer" or "computing device," as used in this disclosure, means any machine, device, circuit, component, or module, or any system of machines, devices, circuits, components, or modules that are capable of manipulating data according to one or more instructions. The terms "computer" or "computing device" include, for example, without limitation, a processor, a microprocessor (µC), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, µCs, CPUs, GPUs, ASICs, general purpose computers, super computers, personal computers, laptop computers, palmtop computers, notebook computers, desktop computers, workstation computers, or servers.

The term "computer resource asset," as used in this disclosure, means a computing resource, a computing device or a communication device.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "computing resource," as used in this disclosure, means software, a software application, a web application, a web page, a computer application, a computer program, computer code, machine executable instructions, or firmware.

The term "connectivity link," as used in this disclosure, means a communication link or any combination of communication links that connects two or more nodes, carrying data packets between the nodes. A data packet can include an Internet Protocol (IP) data packet. A data packet can include an instruction signal that, when received by a communicating device can cause the device to carry out a predetermined function or task. The data packet can include a data packet signal that, when received by a communicating device can be implemented in carrying out a predetermined function or task, or processed to render information.

The term "database," as used in this disclosure, means any combination of software and/or hardware, including at least one application and/or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "node," as used in this disclosure, means a physical or virtual location in a computer network that comprises a computer resource asset.

The term "server," as used in this disclosure, means any combination of software and/or hardware, including at least one application and/or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for remediating a vulnerability in a first computing resource asset in a computer network, the method comprising:
   receiving vulnerability scanning results data from each respective one of a plurality of diverse vulnerability scanners, each vulnerability scanner being arranged to scan a different type of computer resource asset in the computer network;
   storing the received vulnerability scanning results data from each one of the plurality of diverse vulnerability scanners as a collection of vulnerability scanning results data;
   parsing data from the collection of vulnerability scanning results data;
   normalizing the parsed data;
   extracting common features from the normalized data;
   vectorizing the common features to determine feature vectors;
   applying a false positive predictor model to predict a false positive vulnerability in the collection of vulnerability scanning results data;
   separating vulnerability scanning results data that corresponds to one or more predicted false positives from a remainder of the collection of vulnerability scanning result data; and
   sending the remainder of the collection of vulnerability scanning results data to a second computer resource asset.

2. The method in claim 1, further comprising:
creating a vector matrix based on the feature vectors.

3. The method in claim 1, further comprising:
updating a vector matrix based on the feature vectors.

4. The method in claim 3, wherein the applying the false positive prediction model comprises applying the vector matrix to predict the false positive vulnerability in the collection of vulnerability scanning results data.

5. The method in claim 1, further comprising:
   remediating a vulnerability in the first computer resource asset based on a vulnerability scan report in the remainder of the collection of vulnerability scanning results data.

6. The method in claim 5, wherein the second computer resource asset is arranged to interact with a user.

7. The method in claim 1, further comprising:
   analyzing the vulnerability scanning results data that corresponds to the one or more predicted false positives to determine whether any of the one or more predicted false positives is a real false positive.

8. The method in claim 7, further comprising: removing the vulnerability scanning results data that corresponds to the real false positive from any remaining vulnerability scanning results data that corresponds to the one or more predicted false positives.

9. The method in claim 7, further comprising: determining a predicted false positive in the one or more predicted false positives is not a real false positive; and optimizing the false positive predictor model based on vulnerability scanning results data that corresponds to the determined not a false positive.

10. A system for remediating a vulnerability in a first computing resource asset in a computer network, the system comprising:
    a receiver arranged to receive vulnerability scanning results data from each respective one of a plurality of diverse vulnerability scanners, each vulnerability scanner being arranged to scan a different type of computer resource asset in the computer network;
    a storage arranged store the received vulnerability scanning results data from each one of the plurality of diverse vulnerability scanners as a collection of vulnerability scanning results data;
    a normalizer arranged to normalize the collection of vulnerability scanning results data into normalized data;
    a feature extractor arranged to extract common features from the normalized data;
    a vectorizer arranged to vectorize the common features to determine feature vectors;
    a false positive determiner arranged to apply a false positive predictor model to predict a false positive vulnerability in the collection of vulnerability scanning results data;
    a vulnerability remediator arranged to separate vulnerability scanning results data that corresponds to one or more predicted false positives from a remainder of the collection of vulnerability scanning result data; and
    a transmitter arranged to send the remainder of the collection of vulnerability scanning results data to a second computer resource asset.

11. The system in claim 10, wherein the vectorizer is further arranged to create or update a vector matrix based on the feature vectors.

12. The system in claim 10, wherein the vectorizer is further arranged to create or update a vector matrix based on the feature vectors.

13. The system in claim 10, wherein the second computer resource asset is arranged to remediate a vulnerability in the first computer resource asset based on a vulnerability scan report included in the remainder of the collection of vulnerability scanning results data.

14. The system in claim 10, wherein the second computer resource asset is arranged to interact with a user.

15. The system in claim 10, wherein the second computer resource asset is arranged to analyze the vulnerability scanning results data that corresponds to the one or more predicted false positives to determine whether any of the one or more predicted false positives is a real false positive.

16. The system in claim 15, wherein the second computer resource asset is further arranged to remove the vulnerability scanning results data that corresponds to the real false positive from any remaining vulnerability scanning results data that corresponds to the one or more predicted false positives.

17. A non-transitory computer readable storage medium storing computer program instructions that, when executed by a security appliance, remediate a vulnerability in a first computing resource asset in a computer network, the computer program instructions comprising the steps of:
- receiving vulnerability scanning results data from each respective one of a plurality of diverse vulnerability scanners, each vulnerability scanner being arranged to scan a different type of computer resource asset in the computer network;
- storing the received vulnerability scanning results data from each one of the plurality of diverse vulnerability scanners as a collection of vulnerability scanning results data;
- parsing data from the collection of vulnerability scanning results data;
- normalizing the parsed data;
- extracting common features from the normalized data;
- vectorizing the common features to determine feature vectors;
- applying a false positive predictor model to predict a false positive vulnerability in the collection of vulnerability scanning results data;
- separating vulnerability scanning results data that corresponds to one or more predicted false positives from a remainder of the collection of vulnerability scanning result data; and
- sending the remainder of the collection of vulnerability scanning results data to a second computer resource asset.

18. The storage medium in claim 17, wherein the computer program instructions comprise a further step of: creating or updating a vector matrix based on the feature vectors.

19. The storage medium in claim 18, wherein the computer program instructions comprise a further step of: applying the false positive prediction model comprises applying the vector matrix to predict the false positive vulnerability in the collection of vulnerability scanning results data.

20. The storage medium in claim 17, wherein the computer program instructions comprise a further step of: remediating a vulnerability in the first computer resource asset based on a vulnerability scan report in the remainder of the collection of vulnerability scanning results data.

21. The storage medium in claim 18, wherein the computer program instructions comprise a further step of: analyzing the vulnerability scanning results data that corresponds to the one or more predicted false positives to determine whether any of the one or more predicted false positives is a real false positive.

22. The storage medium in claim 21, wherein the computer program instructions comprise a further step of: removing the vulnerability scanning results data that corresponds to the real false positive from any remaining vulnerability scanning results data that corresponds to the one or more predicted false positives.

23. The storage medium in claim 21, wherein the computer program instructions comprise further steps of: determining a predicted false positive in the one or more predicted false positives is not a real false positive; and optimizing the false positive predictor model based on vulnerability scanning results data that corresponds to the determined not a false positive.

* * * * *